United States Patent
Li et al.

(10) Patent No.: US 12,234,869 B1
(45) Date of Patent: Feb. 25, 2025

(54) ELECTRIC MOTOR CLUTCH ACTUATOR CONTROL SYSTEMS AND METHODS

(71) Applicant: GM GLOBAL TECHNOLOGY OPERATIONS LLC, Detroit, MI (US)

(72) Inventors: Dongxu Li, Troy, MI (US); Edward W. Mellet, Rochester Hills, MI (US); Matthew Pruski, Brighton, MI (US); John Jancowski-Walsh, Fenton, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 18/671,932

(22) Filed: May 22, 2024

(51) Int. Cl.
*F16D 48/06* (2006.01)
*F16D 48/08* (2006.01)

(52) U.S. Cl.
CPC ........... *F16D 48/066* (2013.01); *F16D 48/08* (2013.01); *F16D 2500/1026* (2013.01); *F16D 2500/302* (2013.01); *F16D 2500/3024* (2013.01); *F16D 2500/3026* (2013.01); *F16D 2500/30404* (2013.01); *F16D 2500/30808* (2013.01); *F16D 2500/3105* (2013.01); *F16D 2500/5018* (2013.01); *F16D 2500/50236* (2013.01);
(Continued)

(58) Field of Classification Search
CPC ..... F16D 2500/3105; F16D 2500/5018; F16D 48/066; F16D 48/08; F16D 2500/1026; F16D 2500/10412; F16D 2500/3024; F16D 2500/30404; F16D 2500/30401; F16D 2500/3026; F16D 2500/30808; F16D 2500/30806; F16D 2500/3166; F16D 2500/50236; F16D 2500/7041; F16D 2500/70412; F16D 2500/7082
See application file for complete search history.

(56) References Cited

U.S. PATENT DOCUMENTS

| | | | | |
|---|---|---|---|---|
| 5,676,229 | A | * | 10/1997 | Bates .................... F16D 48/066 192/109 R |
| 2015/0094922 | A1 | * | 4/2015 | Dix .......................... F16D 48/06 701/68 |

(Continued)

FOREIGN PATENT DOCUMENTS

| CN | 113357288 A | 9/2021 |
|---|---|---|
| DE | 19856541 A1 | 6/2000 |

(Continued)

OTHER PUBLICATIONS

German Office Action from counterpart DE1020241217413, dated Dec. 5, 2024.

*Primary Examiner* — Timothy Hannon (57) ABSTRACT

A clutch control system for a vehicle includes: a reset module configured to selectively start a reset operation of a clutch actuator of a clutch that engages and disengages an electric propulsion motor to and from a gearset; a target position module configured to perform the reset operation by setting a target position of the clutch actuator to follow a predetermined position profile for the reset operation, the reset operation including (a) opening an orifice between a hydraulic fluid reservoir and an pressure chamber of the clutch actuator (b) closing the orifice after the opening; and a clutch control module configured to actuate the clutch actuator based on the target position thereby performing the reset operation.

20 Claims, 7 Drawing Sheets

(52) U.S. Cl.
CPC ............... *F16D 2500/7041* (2013.01); *F16D 2500/70412* (2013.01)

(56) References Cited

U.S. PATENT DOCUMENTS

2016/0195451 A1\* 7/2016 Fujii ..................... F16D 48/06
73/115.02
2017/0335903 A1\* 11/2017 Kim ..................... F16D 48/06

FOREIGN PATENT DOCUMENTS

| DE | 102009010002 A1 | 8/2010 |
| DE | 102010014659 A1 | 11/2010 |
| DE | 102012103408 A1 | 10/2013 |

\* cited by examiner

ELECTRIC MOTOR CLUTCH ACTUATOR CONTROL SYSTEMS AND METHODS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to electric motor torque transmission systems and more particularly to systems and methods for actuating clutches that engage.

Vehicles with an engine include a battery for starting the engine and supporting accessory loads. Electric vehicles (EVs) such as battery electric vehicles (BEVs), hybrid vehicles, and/or fuel cell vehicles include one or more electric machines and a battery system including one or more battery cells, modules and/or packs to provide propulsion power. A power control system is used to control power to/from the battery system during charging, propulsion and/or regeneration.

Lithium-ion batteries (LIBs) have high power density and are used in EV and non-EV applications. LIBs include anode electrodes, cathode electrodes and separators. The anode electrodes include active material arranged on opposite sides of a current collector. The cathode electrodes include cathode active material arranged on opposite sides of a current collector.

SUMMARY

In a feature, a clutch control system for a vehicle includes: a reset module configured to selectively start a reset operation of a clutch actuator of a clutch that engages and disengages an electric propulsion motor to and from a gearset; a target position module configured to perform the reset operation by setting a target position of the clutch actuator to follow a predetermined position profile for the reset operation, the reset operation including (a) opening an orifice between a hydraulic fluid reservoir and an pressure chamber of the clutch actuator (b) closing the orifice after the opening; and a clutch control module configured to actuate the clutch actuator based on the target position thereby performing the reset operation.

In further features, the reset module is configured to selectively start the reset operation when the vehicle is in one of park and neutral.

In further features, the reset module is configured to start the reset operation when a period since a last reset operation is greater than a predetermined period.

In further features, the reset module is configured to set the predetermined period based on a temperature of the clutch actuator.

In further features, the reset module is configured to start the reset operation when clutch performance degradation is detected.

In further features, the reset module is configured to detect the clutch performance degradation based on at least one of (a) a pressure of hydraulic fluid of the clutch actuator and (b) a jerk of the vehicle.

In further features, the reset module is configured to selectively start the reset operation when the clutch is disengaged such that the electric propulsion motor is decoupled from the gearset.

In further features, the reset module is configured to start the reset operation when a period since a last reset operation is greater than a predetermined period.

In further features, the reset module is configured to set the predetermined period based on a temperature of the clutch actuator.

In further features, the reset module is configured to start the reset operation when clutch performance degradation is detected.

In further features, the target position module is configured to adjust the predetermined position profile based on a temperature of the clutch actuator.

In further features, the target position module is configured to adjust the target position at a first rate during a first period of the reset operation according to the predetermined position profile during the opening of the orifice.

In further features, the target position module is configured to adjust the target position at a second rate during a second period of the reset operation according to the predetermined position profile during the opening of the orifice, where the second period is after the first period and the second rate is less than the first rate.

In further features, the target position module is configured to adjust the target position at a third rate during a third period of the reset operation according to the predetermined position profile during the opening of the orifice, where the third period is after the second period and the third rate is greater than the second rate.

In further features, the target position module is configured to adjust the target position at a fourth rate during a fourth period of the reset operation according to the predetermined position profile during the opening of the orifice, where the fourth period is after the third period and the fourth rate is greater than the third rate.

In further features, the target position module is configured to maintain the target position fixed during a fifth period of the reset operation while the orifice is open, where the fifth period is after the fourth period.

In further features, the target position module is configured to adjusting the target position at a fifth rate during a sixth period of the reset operation according to the predetermined position profile during the closing of the orifice, where the sixth period is after the fifth period.

In further features, the clutch control module is configured to prevent shifting of the clutch during the reset operation.

In further features, the target position module is configured to adjust the target position at a first rate when a piston of the clutch actuator not adjacent to the orifice and adjust the target position at a second rate when the position is adjacent to the orifice, wherein the second rate is slower than the first rate.

In a feature, a clutch control method for a vehicle includes: selectively starting a reset operation of a clutch actuator of a clutch that engages and disengages an electric propulsion motor to and from a gearset; performing the reset operation by setting a target position of the clutch actuator to follow a predetermined position profile for the reset operation, the reset operation including (a) opening an orifice between a hydraulic fluid reservoir and an pressure chamber of the clutch actuator (b) closing the orifice after the opening; and actuating the clutch actuator based on the target position thereby performing the reset operation.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more electric motors, such as for propulsion. A gearbox may include two or more different gearsets. Clutches are used to couple and decouple an electric motor to and from the gearsets for vehicle propulsion. Clutch actuators actuate the clutches, respectively.

Pressure of a clutch actuator may drift over time. A reset operation may be performed periodically to open a pressure chamber of the clutch actuator to a reservoir to reset the pressure within the pressure chamber to a baseline pressure.

According to the present application, a clutch control module controls actuation of the clutch actuator for reset operations to minimize pressure fluctuations with opening the pressure chamber to the reservoir and closing the pressure chamber from the reservoir.

Figure 1:
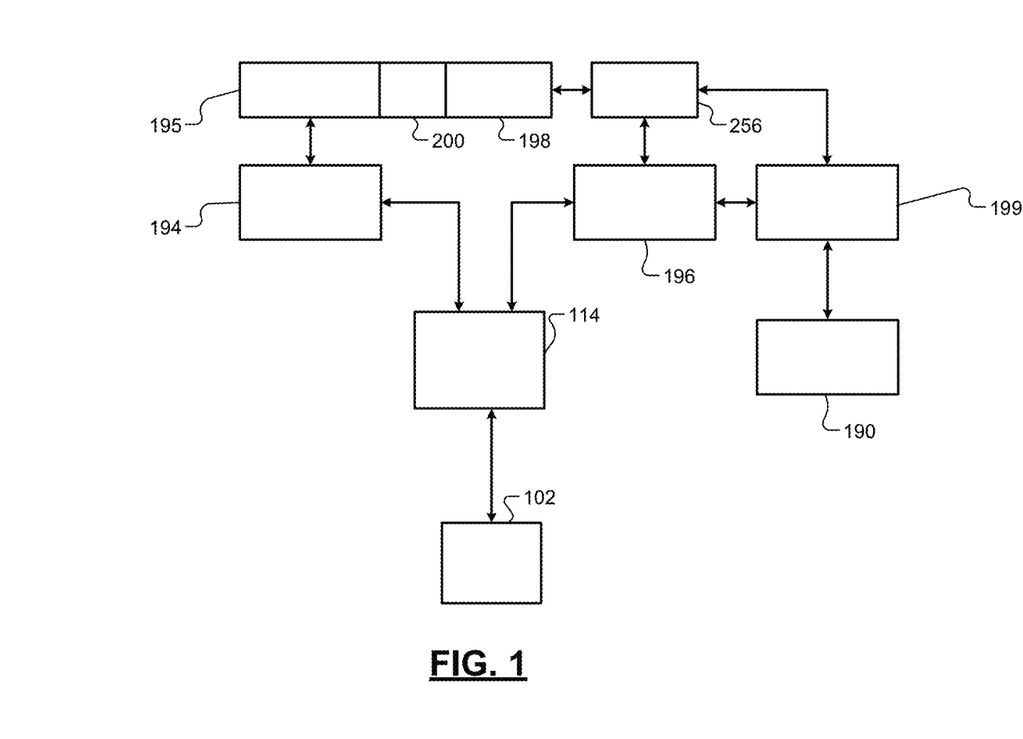
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine (including pure electric vehicles), fuel cell vehicles, autonomous vehicles, and other types of vehicles. Also, while the example of a vehicle is provided, the present application is also applicable to non-vehicle implementations.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor. In various implementations, the electric motor 198 may be used to start the engine 102, such as via a belt.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion or to start the engine 102. The battery 199 may include, for example, one or more battery modules. Each battery module may include a plurality of battery cells.

The electric motor 198 may output torque, for example, to an input shaft of the transmission 195 or to an output shaft of the transmission 195, or to a wheel of the vehicle. Two or more clutches, such as clutch 200 may be engaged to couple the electric motor 198 to the transmission 195 and disengaged to decouple the electric motor 198 from different gear sets of the transmission 195. Gear sets may be implemented between an output of the clutch 200 and an input of the transmission 195 to provide two or more predetermined ratios between rotation of the electric motor 198 and rotation of the input of the transmission 195. The transmission 195 may also be referred to as a gear box.

The motor control module 196 may also selectively control the electric motor 198 to convert mechanical energy of the vehicle into electrical energy. More specifically, the electric motor 198 generates and outputs power when the electric motor 198 is being driven by the transmission 195 and the motor control module 196 is not applying power to the electric motor 198 from the battery 199. The motor control module 196 may charge the battery 199 via the power output by the electric motor 198.

The vehicle may include a charge port 190. A power source, such as a charging station, another vehicle, or another suitable source of power may connect to and charge the battery 199 via the charge port 190. The battery 199 may also be used to power other devices (e.g., other vehicles) via the charge port 190.

Figure 2:
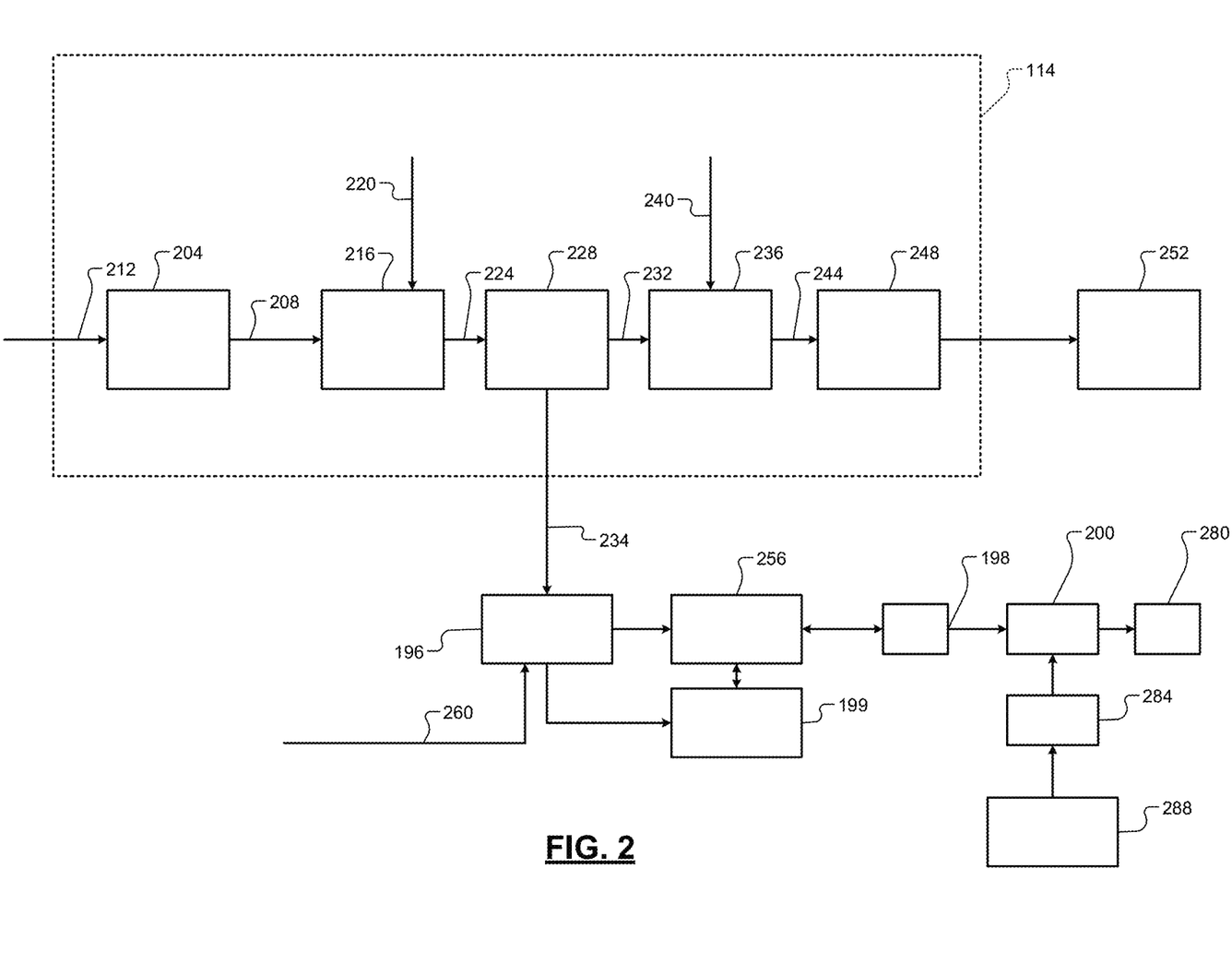
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity in conjunction with the example of FIG. 2, but multiple electric motors may be included. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

In electric vehicles, the driver torque module 204 may input the driver torque request 208 to the motor control module 196 and the components related to controlling engine actuators may be omitted. In the example of multiple electric motors, the motor control module 196 may determine how much torque should be produced by each of the electric motors. The electric motors may be controlled to achieve the same or different amounts of torque.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of switches of an inverter module 256 based on the motor torque request 234. Switching of the inverter module 256 controls power flow from the battery 199 to the electric motor 198. As such, switching of the inverter module 256 controls torque output of the electric motor 198. The inverter module 256 also converts power generated by the electric motor 198 and outputs power to the battery 199, for example, to charge the battery 199.

The motor control module 196 may control switching of switches of the inverter module 256, for example, based on adjusting a torque 260 output of the electric motor 198 toward or to the motor torque request 234 using a closed loop control module. For example, the closed loop control module may include a proportional integral (PI) control module or another suitable type of closed loop control module. The torque 260 of the electric motor 198 may be measured using a torque sensor or estimated (e.g., by the motor control module 196) based on one or more operating parameters, such as using one or more equations and/or lookup tables.

The inverter module 256 includes the plurality of switches. The motor control module 196 switches the switches to convert DC power from the battery 199 into alternating current (AC) power and to apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

While the battery 199 is discussed in conjunction with the vehicle, the present application is also applicable to uses of the battery 199 in other types of devices including non-vehicle applications.

As discussed above, the clutches 200 are used to engage and disengage the electric motor 198 with different sets of gears 280, respectively. For example, a first clutch may be actuated to engage and disengage the electric motor 198 to and from a first gear set. A second clutch may be actuated to engage and disengage the electric motor 198 to and from a second gear set. While the examples of two clutches and two gear sets is provided, the present application is applicable to N clutches and N respective gear sets, where N is an integer greater than or equal to 2.

Clutch actuators 284 actuate the respective clutches 200. The clutch actuators 284 may include, for example, electric motors or another suitable type of actuator.

A clutch control module 288 controls actuation of the clutch actuators 284 and therefore the clutches 200. The clutch control module 288 may control the clutches 200 such that only one clutch is engaged at any given time. Both clutches however may be disengaged at same time under some circumstances.

Figure 3:
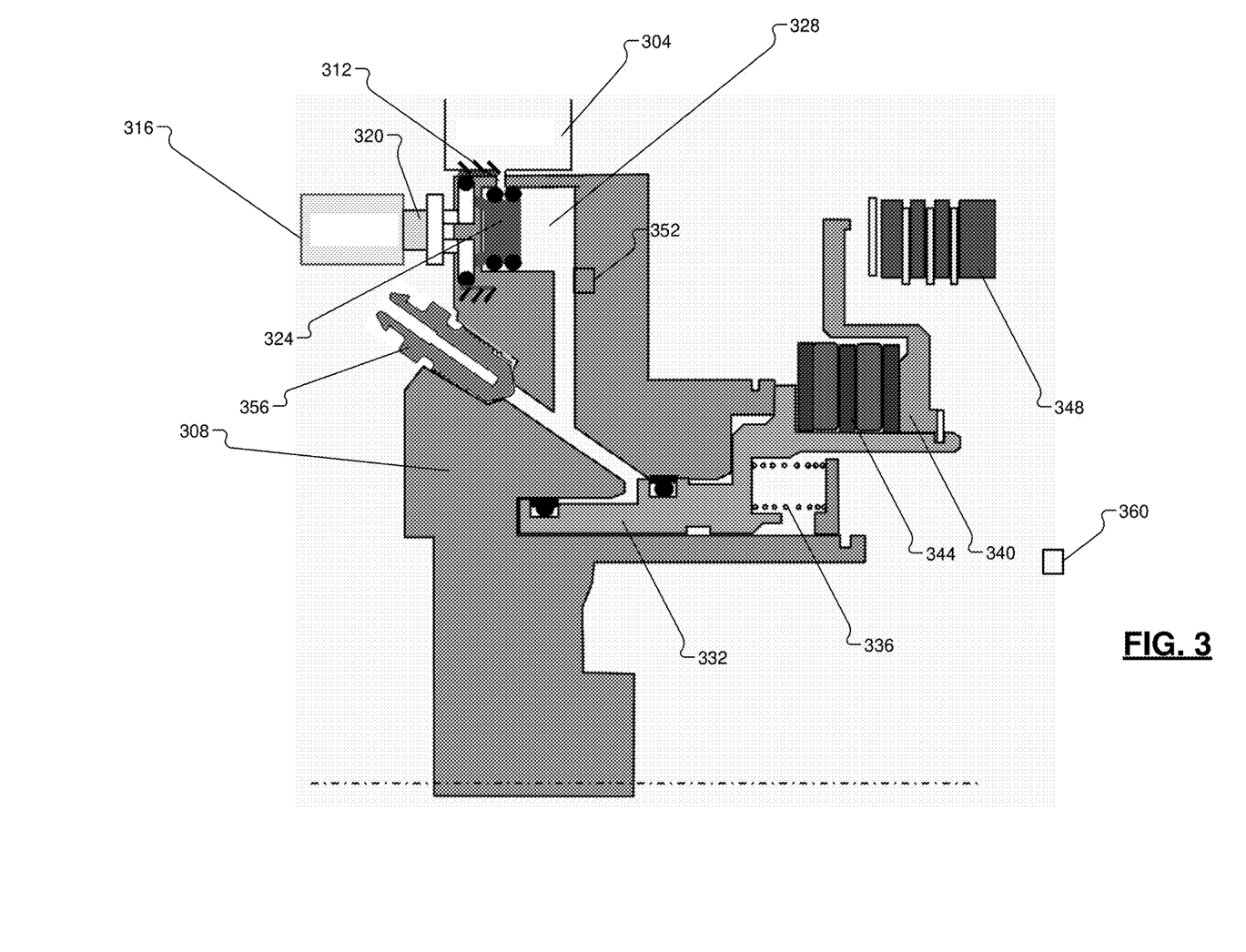
FIGS. 3 and 4 are cross-sectional views of an example implementation of a clutch actuator.
Figure 4:
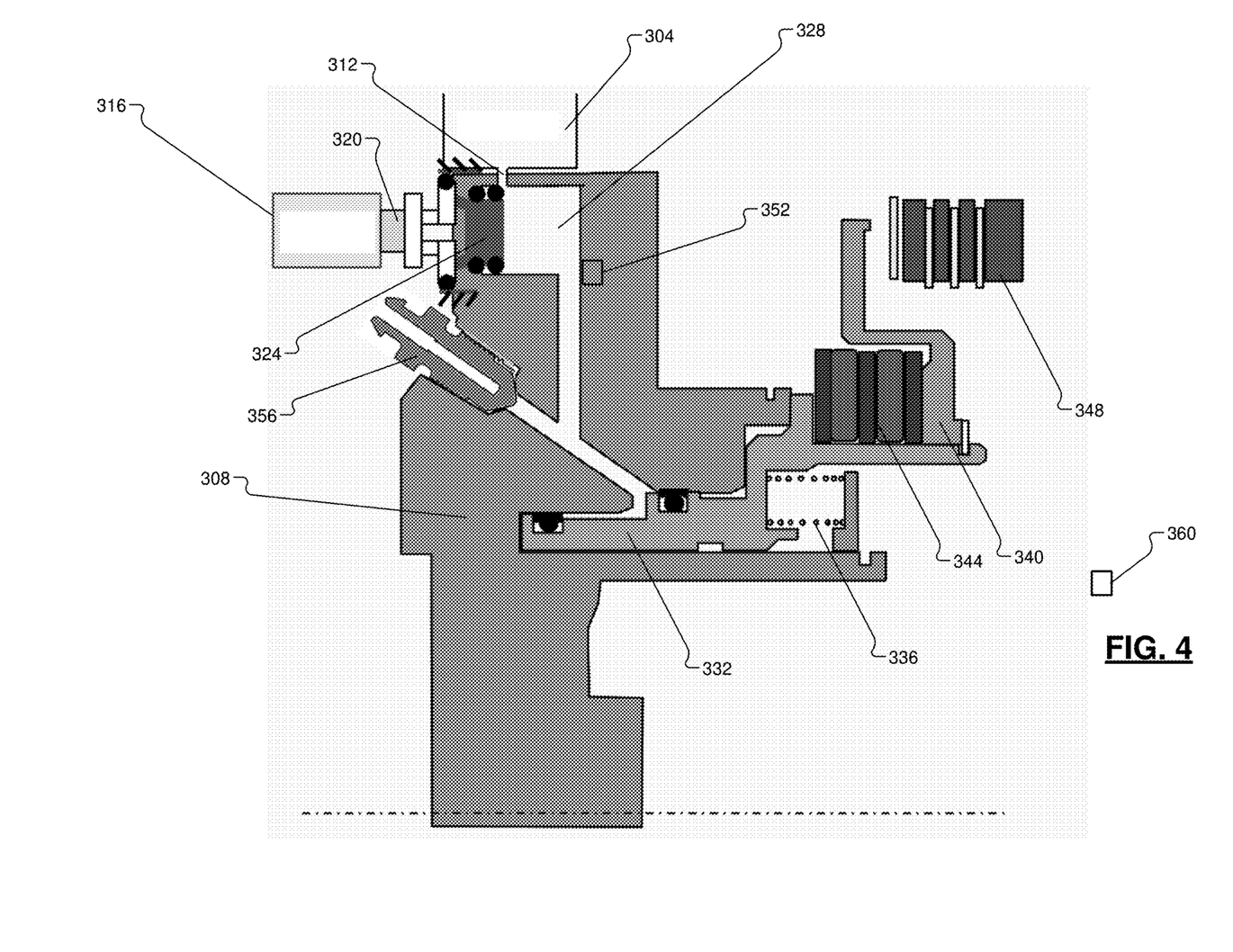

FIGS. 3 and 4 are cross-sectional views of an example implementation of one of the clutch actuators 284. The clutch actuators 284 may be identical or similar and may function the same way.

Hydraulic fluid is stored in a reservoir 304. A body 308 of the clutch actuator 284 includes an orifice 312 that is fluidly connected to the reservoir 304. An actuator 316, such as an electric motor, linearly moves a piston 320. A plunger 324 is connected to and moves with the piston 320. The actuator 316 moves the piston 320 and the plunger 324 to adjust a pressure within a pressure chamber 328 and to block or open the orifice 312 to the reservoir 304. FIG. 3 illustrates the plunger 324 in a position that blocks the orifice 312 such that the reservoir 304 and the pressure chamber 328 are not fluidly coupled. FIG. 4 illustrates the plunger 324 in a position where the orifice 304 is not blocked and the reservoir 304 and the pressure chamber 328 are fluidly connected. Pressure within the reservoir 304 and pressure within the pressure chamber 328 will become the same when the orifice 304 is open for a period of time.

Movement of the plunger 324 controls movement of a second piston 332. More specifically, the actuator 316 moves the plunger 324 rightward in FIGS. 3 and 4 causes rightward movement of the second piston 332 while the orifice 312 is blocked. Leftward movement of the plunger 324 causes leftward movement of the second piston 332.

A biasing device, such as one or more springs, biases the second piston 332 leftward. An arm 340 is coupled to the second piston 332 and moves linearly with the second piston 332. One or more compliance devices 344, such as one or more spacers and/or waveplates, may be disposed between the arm 340 and a portion of the second piston 332.

The arm 348 engages a load cell 348 on a backplate of the clutch 200. Rightward movement of the second piston 332 causes rightward movement of the arm 340 into the load cell 348, which engages the clutch 200 thereby coupling the electric motor 198 with the gear set. Leftward movement of the second piston 332 causes leftward movement of the arm 340, which disengages the clutch 200 thereby decoupling the electric motor 198 from the gear set. When coupled, the electric motor 198 transfers torque to the gear set and rotation of the electric motor 198 causes rotation of the gear set. When decoupled, the electric motor 198 does not transfer torque to the gear set and rotation of the electric motor 198 does not cause rotation of the gear set.

A temperature sensor 352 measures a temperature of the fluid within the pressure chamber 328. A pressure sensor 356 measures a pressure of the fluid within the pressure chamber 328. One or more position sensors 360 measure a position of the second piston 332 and/or the arm 340, such as optically.

When the orifice 312 is closed, the pressure within the pressure chamber 328 may naturally drift over time. A reset operation may be performed by the clutch control module 288 under some circumstances to open the orifice 312 and cause the pressure within the pressure chamber 328 to equalize with the pressure within the reservoir 304. Pressure fluctuations however may occur when the plunger 324 begins to open the orifice 312 and when the plunger 324 transitions the orifice 312 from partially open to fully closed.

The clutch control module 288 controls the position of the clutch actuator 284 (e.g., the position of the second piston 332 or the position of the arm 340) according to a predetermined profile for each reset operation. This minimizes pressure fluctuations associated with the opening and closing of the orifice 312.

Figure 5:
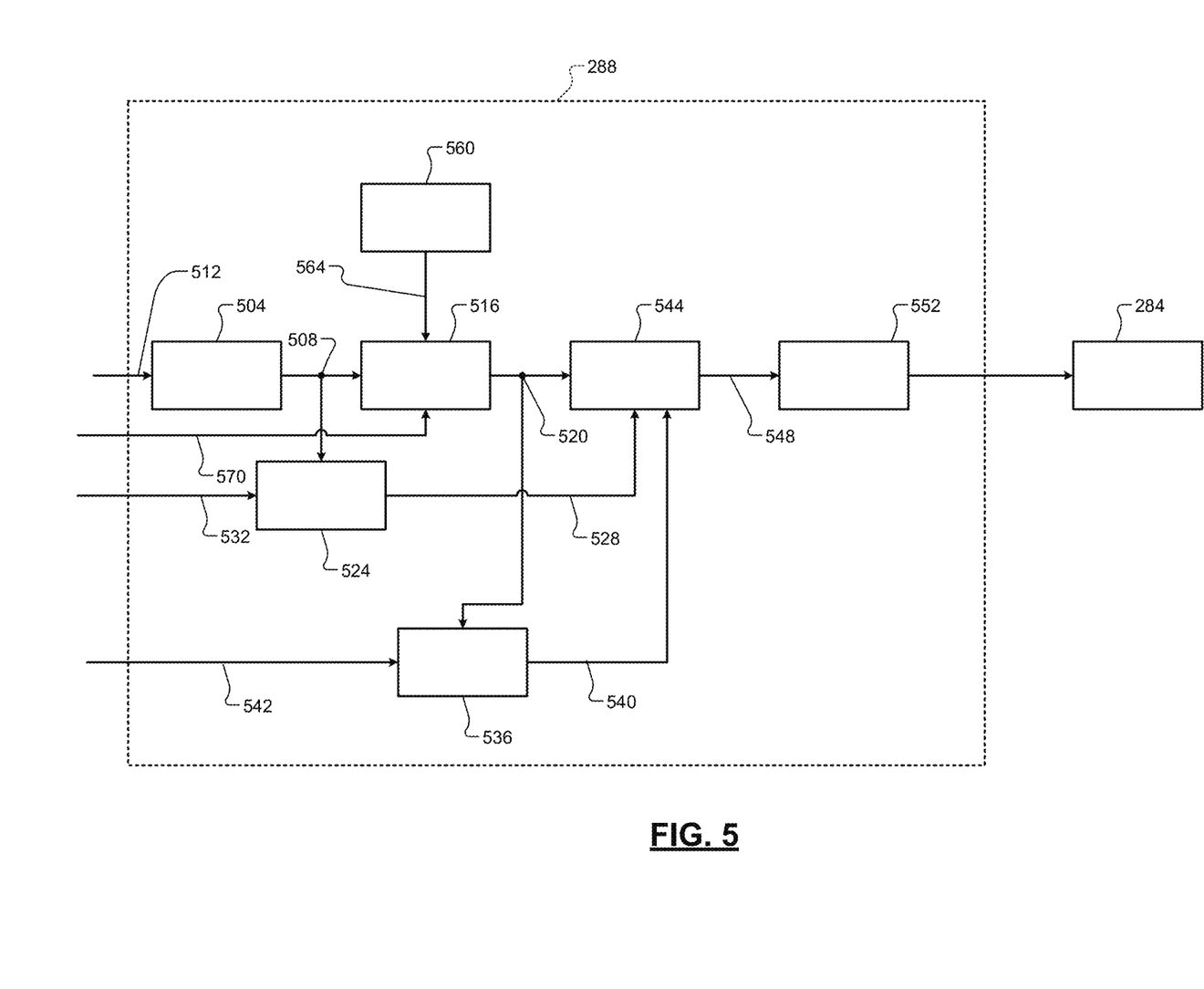
FIG. 5 is a functional block diagram of an example implementation of a clutch control module.

FIG. 5 is a functional block diagram of an example implementation of the clutch control module 288. A target pressure module 504 determines a target pressure 508 within the pressure chamber 328 based on one or more operating parameters 512 and/or requests. The target pressure module 504 may determine the target pressure 508 for example using one or more lookup tables and/or equations that relate the inputs to target pressure.

A target position module 516 determines a target position 520 of the clutch actuator 284 (e.g., the position of the second piston 332 or the position of the arm 340) based on the target position 520. For example, the target position module 516 may determine the target position 520 using one of a lookup table and an equation that relates target pressures to target positions.

A first adjustment module 524 determines a first adjustment 528 based on a difference (subtraction) between the pressure 532 within the pressure chamber 328 and the target pressure 508. The pressure 532 is measured by the pressure sensor 356. The first adjustment 528 may be, for example, an offset value or a scalar value.

A second adjustment module 536 determines a second adjustment 540 based on a difference (subtraction) between the position 542 of the clutch actuator 284 and the target position 520. The position 542 is measured via one or more position sensors 558. The second adjustment 540 may be, for example, an offset value or a scalar value.

An adjusting module 544 determines an adjusted target position 548 based on the target position 520, the first adjustment 528, and the second adjustment 540. In the example of offsets, the adjusting module 544 may set the adjusted target position 548 based on or equal to the target position 520 plus the first adjustment 528 plus the second adjustment 540. In the example of scalars, the adjusting module 544 may set the adjusted target position 548 based on or equal to the target position 520 multiplied by the first adjustment 528 and by the second adjustment 540.

An actuator control module 552 actuates the clutch actuator 284 to the adjusted target position 548. For example, the actuator control module 552 may apply power (e.g., from the battery 199) to the actuator (e.g., electric motor) 316 to linearly adjust the position 544 to the adjusted target position 548.

A reset module 560 selectively starts performance of a reset operation of the clutch actuator 284. During the reset operation, the orifice 312 is opened and re-closed. The reset module 560 starts performance of a reset operation by generating a reset indicator 564 (e.g., setting the reset indicator 564 to a first state).

The target position module 516 sets the target position 520 to a predetermined profile over time for the reset operation in response to the generation of the reset indicator 564. The predetermined profile includes a time series of target positions to use to accomplish the reset operation. The predetermined profile may be stored in memory. In various implementations, the target position module 516 may scale the target positions of the target profile by a scalar value and determine the scalar value based on the temperature 570 within the pressure chamber 328 measured by the temperature sensor 352. The target position module 516 may determine the scalar value using one of a lookup table and an equation that relates temperatures to scalar values. For example, the target position module 516 may decrease the scalar value as the temperature increases and vice versa. The adjusting module 544 may set the adjusted target position 548 to the target position 520 during the reset operation.

Figure 6:
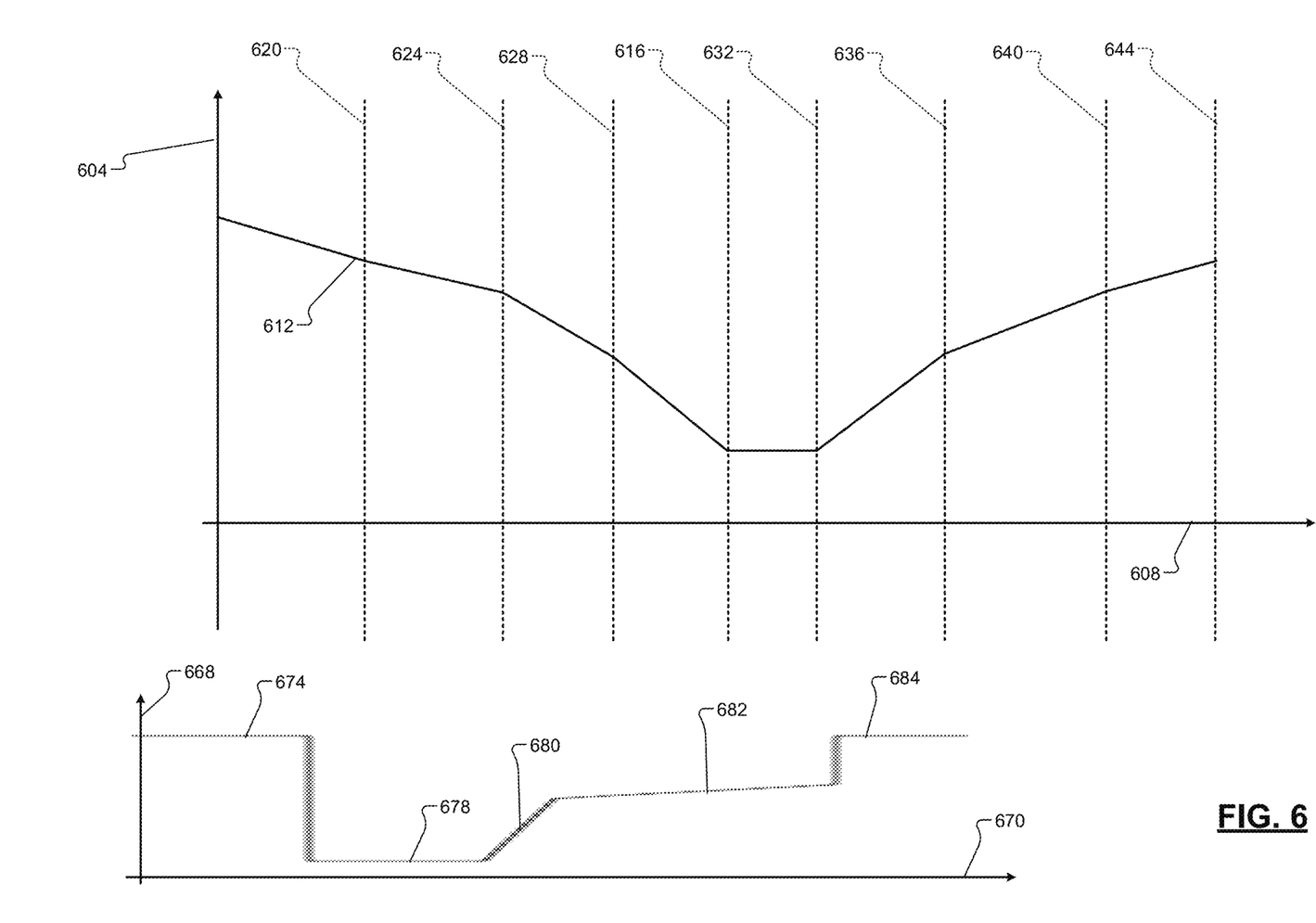
FIG. 6 is a time series of an example positions of a predetermined position profile for a reset operation.

FIG. 6 includes a time series of an example positions of the predetermined position profile. Positions 604 are graphed over time 608. The orifice 312 is closed initially. Following the predetermined profile 612, the target position module 516 transitions the orifice 312 to fully open at time 616.

During a first period of the reset operation between the initial time and time 620, the target position module 612 adjusts the target position 520 to open the orifice 312 and move the piston 320 in a first direction (left in the example of FIG. 3) at a first predetermined rate. During a second period of the reset operation between the time 620 and time 624, the target position module 612 adjusts the target position 520 to open the orifice 312 and move the piston 320 in the first direction at second predetermined rate. The second predetermined rate is less than the first predetermined rate.

During a third period of the reset operation between the time 624 and time 628, the target position module 612 adjusts the target position 520 to open the orifice 312 and move the piston 320 in the first direction at third predetermined rate. The third predetermined rate may be greater than the second predetermined rate and may be greater than the first predetermined rate.

During a fourth period of the reset operation between the time 628 and the time 616, the target position module 612 adjusts the target position 520 to open the orifice 312 and move the piston 320 in the first direction at fourth predetermined rate. The fourth predetermined rate may be greater than the third predetermined rate, greater than the second predetermined rate, and greater than the first predetermined rate.

As discussed above, the orifice 312 is fully open at time 616. The target position module 612 maintains the target position 520 fixed during a dwell (fifth) period between the time 616 and time 632. This allows the pressure within the actuator and the pressure within the reservoir 304 to equalize. The first period may be the same as or greater than the second period. The third period may be less than the second period. The fourth period may be greater than the third period and less than the second period.

The target position module 612 begins closing the orifice 312 at time 632 after the dwell period has passed.

During a sixth period of the reset operation between the time 632 and time 636, the target position module 612 adjusts the target position 520 to close the orifice 312 and move the piston 320 in a second direction opposite the first direction at a fifth predetermined rate. During a seventh period of the reset operation between the time 636 and time 640, the target position module 612 adjusts the target position 520 to close the orifice 312 and move the piston 320 in the second direction at a sixth predetermined rate. The sixth predetermined rate may be less than the fifth predetermined rate. The seventh period may be greater than the sixth period.

During an eighth period of the reset operation between the time 640 and time 644, the target position module 612 adjusts the target position 520 to close the orifice 312 and move the piston 320 in the second direction at a seventh predetermined rate. The seventh predetermined rate may be less than the sixth predetermined rate and less than the fifth predetermined rate. The eighth period may be less than the sixth period and less than the seventh period. The reset operation may be complete at 644 at which time the orifice 312 may be fully closed.

FIG. 6 also includes an example graph of pressure 668 versus time 670. The pressure may initially be high at 674. The pressure may be decreased (e.g., in a step) to 678. The pressure may be increased at a first rate 680. The pressure may be increased at a second rate 682 that is less than the first rate 680. The pressure may be increased to 684, such as in a step. Generally speaking, the piston may be retrieved quickly and returned it to its original position in stages and especially move it slowly thru the orifice for consistency and decreasing pressure fluctuations.

Figure 7:
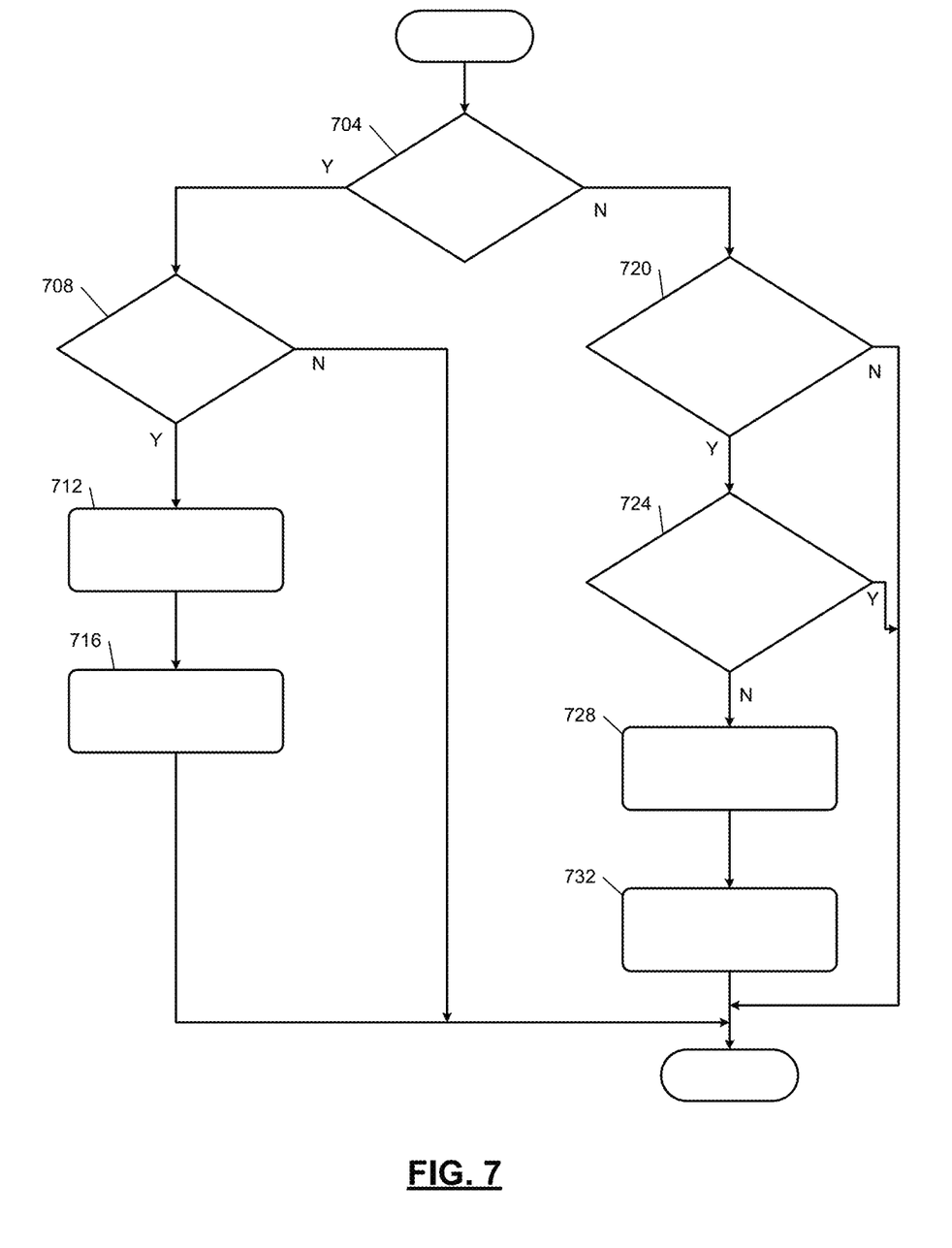
FIG. 7 is a flowchart depicting an example method of performing a reset operation.

FIG. 7 is a flowchart depicting an example method of performing a reset operation. Control may begin with 704 where the reset module 560 may determine whether the vehicle is in park or neutral. If 704 is true, control may continue with 708. If 704 is false, control may continue with 720, which is discussed further below.

At 708, the reset module 560 may determine whether at least one of (a) a period since a last reset operation was completed is greater than a predetermined period and (b) clutch performance degradation has been detected. If 708 is true, the reset module 560 generates the reset indicator 564 and control may continue with 712. If 708 is false, a reset operation may not be performed at that time and control may end. The reset module 560 may determine the predetermined period based on the temperature 570, such as using one of an equation and a lookup table that relates temperatures to periods. The reset module 560 may, for example, decrease the predetermined period as the temperature increases and vice versa. The reset module 560 may detect clutch performance degradation, for example, based on at least one of (a) the pressure 532 and (b) a jerk of the vehicle. For example, the reset module 560 may determine that clutch performance degradation has occurred when the pressure 532 meets one or more predetermined conditions and/or the jerk meets one or more predetermined conditions.

At 712, the target position module 516 determines the predetermined profile for the target position 520 for the reset operation as discussed above. At 716, the target position module 516 adjusts the target position 520 to follow the predetermined profile for the reset operation. The actuator control module 552 actuates the clutch actuator 284 to follow the target position 520 to perform the reset operation.

At 720, the reset module 560 may determine whether the clutch is presently disengaged and at least one of (a) a period since a last reset operation was completed is greater than a predetermined period and (b) clutch performance degradation has been detected. If 720 is true, the reset module 560 generates the reset indicator 564 and control may continue with 724. If 720 is false, a reset operation may not be performed at that time and control may end. The reset module 560 may determine the predetermined period based on the temperature 570, such as using one of an equation and a lookup table that relates temperatures to periods. The reset module 560 may, for example, decrease the predetermined period as the temperature increases and vice versa. The reset module 560 may detect clutch performance degradation, for example, based on at least one of (a) the pressure 532 and (b) the jerk of the vehicle. For example, the reset module 560 may determine that clutch performance degradation has occurred when the pressure 532 meets one or more predetermined conditions and/or the jerk meets one or more predetermined conditions.

At 728, the target position module 516 determines the predetermined profile for the target position 520 for the reset operation as discussed above. At 732, the target position module 516 adjusts the target position 520 to follow the predetermined profile for the reset operation. The actuator control module 552 actuates the clutch actuator 284 to follow the target position 520 to perform the reset operation. The reset module 560 also prohibits shifting (e.g., engagement) of the clutch during the performance of the reset operation at 732. For example, the reset module 560 may delaying a schedules shift involving the clutch until the reset procedure is completed.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A clutch control system for a vehicle, comprising:
    a reset module configured to selectively start a reset operation of a clutch actuator of a clutch of the vehicle, the clutch engaging and disengaging an electric propulsion motor of the vehicle to and from a gearset of the vehicle;
    a target position module configured to perform the reset operation by setting a target position of the clutch actuator to follow a predetermined position profile for the reset operation,
    the reset operation including (a) opening an orifice between a hydraulic fluid reservoir and a pressure chamber of the clutch actuator (b) closing the orifice after the opening; and
    a clutch control module configured to actuate the clutch actuator based on the target position thereby performing the reset operation.

2. The clutch control system of claim 1 wherein the reset module is configured to selectively start the reset operation when the vehicle is in one of park and neutral.

3. The clutch control system of claim 2 wherein the reset module is configured to start the reset operation when a period since a last reset operation is greater than a predetermined period.

4. The clutch control system of claim 3 wherein the reset module is configured to set the predetermined period based on a temperature of the clutch actuator.

5. The clutch control system of claim 2 wherein the reset module is configured to start the reset operation when clutch performance degradation is detected.

6. The clutch control system of claim 5 wherein the reset module is configured to detect the clutch performance degradation based on at least one of (a) a pressure of hydraulic fluid of the clutch actuator and (b) a jerk of the vehicle.

7. The clutch control system of claim 1 wherein the reset module is configured to selectively start the reset operation when the clutch is disengaged.

8. The clutch control system of claim 7 wherein the reset module is configured to start the reset operation when a period since a last reset operation is greater than a predetermined period.

9. The clutch control system of claim 8 wherein the reset module is configured to set the predetermined period based on a temperature of the clutch actuator.

10. The clutch control system of claim 7 wherein the reset module is configured to start the reset operation when clutch performance degradation is detected.

11. The clutch control system of claim 1 wherein the target position module is configured to adjust the predetermined position profile based on a temperature of the clutch actuator.

12. The clutch control system of claim 1 wherein the target position module is configured to adjust the target position at a first rate during a first period of the reset operation according to the predetermined position profile during the opening of the orifice.

13. The clutch control system of claim 12 wherein the target position module is configured to adjust the target position at a second rate during a second period of the reset operation according to the predetermined position profile during the opening of the orifice,
    wherein the second period is after the first period and the second rate is less than the first rate.

14. The clutch control system of claim 13 wherein the target position module is configured to adjust the target position at a third rate during a third period of the reset operation according to the predetermined position profile during the opening of the orifice,
    wherein the third period is after the second period and the third rate is greater than the second rate.

15. The clutch control system of claim 14 wherein the target position module is configured to adjust the target position at a fourth rate during a fourth period of the reset operation according to the predetermined position profile during the opening of the orifice,
    wherein the fourth period is after the third period and the fourth rate is greater than the third rate.

16. The clutch control system of claim 15 wherein the target position module is configured to maintain the target position fixed during a fifth period of the reset operation while the orifice is open,
    wherein the fifth period is after the fourth period.

17. The clutch control system of claim 16 wherein the target position module is configured to adjusting the target position at a fifth rate during a sixth period of the reset operation according to the predetermined position profile during the closing of the orifice,
    wherein the sixth period is after the fifth period.

18. The clutch control system of claim 1 wherein the clutch control module is configured to prevent shifting of the clutch during the reset operation.

19. The clutch control system of claim 18 wherein the target position module is configured to adjust the target position at a first rate when a piston of the clutch actuator not adjacent to the orifice and adjust the target position at a second rate when the position is adjacent to the orifice, wherein the second rate is slower than the first rate.

20. A clutch control method for a vehicle, comprising:
    selectively starting a reset operation of a clutch actuator of a clutch that engages and disengages an electric propulsion motor to and from a gearset;
    performing the reset operation by setting a target position of the clutch actuator to follow a predetermined position profile for the reset operation,
    the reset operation including (a) opening an orifice between a hydraulic fluid reservoir and an pressure chamber of the clutch actuator (b) closing the orifice after the opening; and
    actuating the clutch actuator based on the target position thereby performing the reset operation.

* * * * *